(12) United States Patent
Bartholomew et al.

(10) Patent No.: US 11,479,693 B2
(45) Date of Patent: Oct. 25, 2022

(54) ADHESIVE LAMINATES AND METHOD FOR MAKING ADHESIVE LAMINATES

(71) Applicant: Avery Dennison Corporation, Glendale, CA (US)

(72) Inventors: Eric L. Bartholomew, Mill Hall, PA (US); Nishad Dhopatkar, Lock Haven, PA (US); Yara Ghoussoub, Lock Haven, PA (US); Pavel Janko, Haarlem (NL); Mena R. Klittich, Lock Haven, PA (US); Christopher E. Kohler, S. Williamsport, PA (US); Brandon S. Miller, Lock Haven, PA (US); Kerry L. O'Donnell, Lock Haven, PA (US); David W. Whitman, State College, PA (US)

(73) Assignee: Avery Dennison Corporation, Glendale, CA (US)

(*) Notice: Subject to any disclaimer, the term of this patent is extended or adjusted under 35 U.S.C. 154(b) by 0 days.

(21) Appl. No.: 17/052,612

(22) PCT Filed: May 3, 2019

(86) PCT No.: PCT/US2019/030534
§ 371 (c)(1),
(2) Date: Nov. 3, 2020

(87) PCT Pub. No.: WO2019/213475
PCT Pub. Date: Nov. 7, 2019

(65) Prior Publication Data
US 2021/0238451 A1    Aug. 5, 2021

Related U.S. Application Data

(60) Provisional application No. 62/666,544, filed on May 3, 2018.

(51) Int. Cl.
C09J 7/29      (2018.01)
C09J 7/38      (2018.01)
(Continued)

(52) U.S. Cl.
CPC . C09J 7/29 (2018.01); C09J 7/38 (2018.01); C09J 9/02 (2013.01); *C09J 7/40* (2018.01);
(Continued)

(58) Field of Classification Search
CPC ......... C09J 7/29; C09J 7/38; C09J 9/02; C09J 7/40; C09J 2301/12; C09J 2301/122;
(Continued)

(56) References Cited

U.S. PATENT DOCUMENTS 4,904,475 A    2/1990    Gale et al.
5,164,444 A    11/1992   Bernard
(Continued)

FOREIGN PATENT DOCUMENTS

BR    0017124        3/2003
CL    201702756      5/2018
(Continued)

OTHER PUBLICATIONS

International Search Report and Written Opinion dated Oct. 16, 2019 issued in corresponding IA No. PCT/US2019/030534 filed May 3, 2019.
(Continued)

*Primary Examiner* — Patricia L. Nordmeyer

(57) ABSTRACT

A variety of adhesive laminates are described, many of which perform functions such as liquid indication, outgassing, liquid retention, electrical conducting, and sound channeling. Also described are adhesive regions on face materials in which the regions exhibit particular dimensional proportions. Methods involving direct and transfer coating of adhesives are also described. In a particular version, a (Continued)

method of roll to roll transfer coating of sprayed pressure sensitive adhesives is described. Also described are various adhesive films and laminates many of which can be produced using the methods.

98 Claims, 8 Drawing Sheets

(51) Int. Cl.
    *C09J 9/02*     (2006.01)
    *C09J 7/40*     (2018.01)

(52) U.S. Cl.
    CPC ...... *C09J 2301/12* (2020.08); *C09J 2301/122* (2020.08); *C09J 2301/202* (2020.08); *C09J 2301/204* (2020.08); *C09J 2301/302* (2020.08); *C09J 2301/314* (2020.08); *Y10T 428/14* (2015.01)

(58) Field of Classification Search
    CPC ............ C09J 2301/202; C09J 2301/204; C09J 2301/302; C09J 2301/314; C09J 9/00; Y10T 428/14
    See application file for complete search history.

(56) References Cited

U.S. PATENT DOCUMENTS

| | | |
|---|---|---|
| 5,183,459 A | 2/1993 | Bernard |
| 5,194,299 A | 3/1993 | Fry |
| 5,264,532 A | 11/1993 | Bernard |
| 5,294,258 A | 3/1994 | Jarrell |
| 5,385,965 A | 1/1995 | Bernard |
| 5,750,444 A | 5/1998 | Jarrell et al. |
| 5,833,678 A | 11/1998 | Ashton et al. |
| 5,840,327 A | 11/1998 | Gale et al. |
| 5,897,930 A | 4/1999 | Calhoun et al. |
| 5,957,126 A | 9/1999 | Neeser |
| 6,060,115 A | 5/2000 | Borowski et al. |
| 6,110,565 A | 8/2000 | Matthews |
| 6,121,166 A | 9/2000 | Wood et al. |
| 6,136,732 A | 10/2000 | Patel |
| 6,171,985 B1 | 1/2001 | Joseph et al. |
| 6,187,432 B1 | 2/2001 | Krish et al. |
| 6,197,406 B1 | 3/2001 | Kwok |
| 6,200,635 B1 | 3/2001 | Kwok |
| 6,368,687 B1 | 4/2002 | Joseph et al. |
| 6,383,630 B1 | 5/2002 | Jauchen et al. |
| 6,391,387 B1 | 5/2002 | Rutledge et al. |
| 6,461,430 B1 | 10/2002 | Kwok |
| 6,470,943 B1 | 10/2002 | Borowski et al. |
| 6,495,229 B1 | 12/2002 | Carte et al. |
| 6,503,855 B1 | 1/2003 | Menzies et al. |
| 6,511,927 B1 | 1/2003 | Ellis et al. |
| 6,547,878 B2 | 4/2003 | Rutledge et al. |
| 6,548,727 B1 | 4/2003 | Swenson |
| 6,793,762 B1 | 9/2004 | Kondo et al. |
| 6,881,471 B2 | 4/2005 | Toussant et al. |
| 6,881,875 B2 | 4/2005 | Swenson |
| 6,901,712 B2 | 6/2005 | Lionel |
| 7,037,580 B2 | 5/2006 | Razavi et al. |
| 7,087,279 B2 | 8/2006 | Callahan et al. |
| 7,176,148 B2 | 2/2007 | Repp et al. |
| 7,318,590 B2 | 1/2008 | Razavi |
| 7,329,622 B1 | 2/2008 | Uili |
| 7,732,046 B2 | 6/2010 | Labrosse et al. |
| 7,798,434 B2 | 9/2010 | Bondeson et al. |
| 8,074,902 B2 | 12/2011 | Burmester et al. |
| 8,163,365 B2 | 4/2012 | Weiner et al. |
| 8,197,925 B2 | 6/2012 | Sankey et al. |
| 8,252,407 B2 | 8/2012 | Hannington |
| 8,323,730 B2 | 12/2012 | Brune |
| 8,399,053 B2 | 3/2013 | Bondeson |
| 8,404,071 B2 | 3/2013 | Cope et al. |
| 8,435,600 B2 | 5/2013 | Burmester et al. |
| 8,469,486 B2 | 6/2013 | Sutton et al. |
| 8,535,756 B2 | 9/2013 | Bondeson et al. |
| 8,537,184 B2 | 9/2013 | Roth |
| 8,550,381 B2 | 10/2013 | Burmester et al. |
| 8,586,159 B2 | 11/2013 | Sankey et al. |
| 8,624,078 B2 | 1/2014 | Buus et al. |
| 8,679,285 B2 | 3/2014 | Erickson |
| 8,721,037 B2 | 5/2014 | Sutton et al. |
| 8,840,984 B1 | 9/2014 | Umphlett et al. |
| 8,946,499 B2 | 2/2015 | Iyer et al. |
| 9,058,753 B2 | 6/2015 | Van Boom et al. |
| 9,165,739 B2 | 10/2015 | Ueda |
| 9,221,573 B2 | 12/2015 | Lorence et al. |
| 9,433,534 B2 | 9/2016 | Addison et al. |
| 9,598,532 B2 | 3/2017 | Bowman et al. |
| 9,613,547 B2 | 4/2017 | Weiner et al. |
| 9,627,231 B2 | 4/2017 | Narendmath et al. |
| 9,809,004 B2 | 11/2017 | Nowak et al. |
| 10,287,464 B2 | 5/2019 | Gower et al. |
| 10,357,795 B2 | 7/2019 | O'Hare et al. |
| 10,510,270 B2 | 12/2019 | Wild et al. |
| 2002/0146952 A1 | 10/2002 | Kulper et al. |
| 2003/0148691 A1 | 8/2003 | Pelham et al. |
| 2004/0137202 A1 | 7/2004 | Hamilton et al. |
| 2005/0084647 A1 | 4/2005 | Menzies et al. |
| 2006/0083894 A1* | 4/2006 | Vetrovec ............ B29C 63/0047 428/137 |
| 2007/0154670 A1 | 7/2007 | Hannington |
| 2007/0166510 A1 | 7/2007 | Kato et al. |
| 2007/0218269 A1* | 9/2007 | Kato .......................... C09J 7/22 428/304.4 |
| 2008/0145681 A1 | 6/2008 | Toas et al. |
| 2008/0166939 A1 | 7/2008 | Black et al. |
| 2008/0299346 A1* | 12/2008 | Onderisin ................. B32B 7/06 428/41.8 |
| 2009/0053449 A1* | 2/2009 | Hannington ............... C09J 7/35 428/41.8 |
| 2009/0250522 A1 | 10/2009 | Williams et al. |
| 2010/0209671 A1* | 8/2010 | Kato .......................... C09J 7/38 428/167 |
| 2011/0044013 A1 | 2/2011 | Wei et al. |
| 2011/0159241 A1 | 6/2011 | Xia et al. |
| 2012/0045604 A1 | 2/2012 | Gavel et al. |
| 2012/0058289 A1 | 3/2012 | Coates et al. |
| 2012/0107191 A1 | 5/2012 | Strahie et al. |
| 2012/0242744 A1 | 9/2012 | Sutton et al. |
| 2013/0052387 A1 | 2/2013 | Tani et al. |
| 2013/0334713 A1 | 12/2013 | Xu et al. |
| 2014/0120268 A1 | 5/2014 | Akiyama et al. |
| 2014/0234593 A1 | 8/2014 | Umeda et al. |
| 2015/0150400 A1 | 6/2015 | Bennett |
| 2016/0046775 A1 | 2/2016 | Mai et al. |
| 2016/0230047 A1 | 8/2016 | Varn et al. |
| 2017/0009105 A1 | 1/2017 | Baetzold et al. |
| 2017/0044404 A1 | 2/2017 | Yamamoto et al. |
| 2017/0044406 A1* | 2/2017 | Hubbard ................. B32B 5/022 |
| 2017/0137671 A1 | 5/2017 | Ogomi et al. |
| 2019/0321235 A1 | 10/2019 | Shirotani et al. |
| 2020/0164192 A1 | 5/2020 | Quan |

FOREIGN PATENT DOCUMENTS

| | | |
|---|---|---|
| CL | 202001655 | 10/2020 |
| CN | 1070248 | 8/2001 |
| CN | 1154452 | 6/2004 |
| CN | 1163564 | 8/2004 |
| CN | 1196535 | 4/2005 |
| CN | 100506526 | 7/2009 |
| CN | 100551984 | 10/2009 |
| CN | 201372261 Y | 12/2009 |
| CN | 201459013 U | 5/2010 |
| CN | 1822993 | 9/2010 |
| CN | 204125416 U | 1/2015 |
| CN | 102186602 | 5/2015 |
| CN | 205099615 U | 3/2016 |
| CN | 205099616 U | 3/2016 |
| CN | 205099617 U | 3/2016 |

(56) References Cited

FOREIGN PATENT DOCUMENTS

| | | |
|---|---|---|
| CN | 106488842 | 3/2017 |
| CN | 106471082 | 7/2021 |
| EP | 0568812 | 10/1998 |
| EP | 1672043 | 6/2006 |
| EP | 1842563 | 10/2007 |
| EP | 0984083 | 10/2008 |
| EP | 2199356 | 6/2010 |
| EP | 1929079 | 3/2012 |
| EP | 3049496 | 8/2016 |
| EP | 1255575 | 12/2018 |
| EP | 3103849 | 9/2019 |
| IN | 205803 | 4/2007 |
| IN | 1275/MAS/1995 | 9/2008 |
| IN | 867/CHENP/2008 | 11/2008 |
| IN | 230814 | 3/2009 |
| IN | 2498/DELNP/2009 | 8/2010 |
| IN | 3559/CHE/2012 | 12/2013 |
| IN | 3560/DELNP/2013 | 11/2014 |
| IN | 5558/CHENP/2013 | 12/2014 |
| IN | 5369/DELNP/2014 | 3/2015 |
| IN | 8884/DELPN/2014 | 5/2015 |
| IN | 9012/DELNP/2014 | 5/2015 |
| IN | 266431 | 5/2015 |
| IN | 267066 | 6/2015 |
| IN | 7545/DELNP/2015 | 1/2016 |
| IN | 201617008980 | 7/2016 |
| IN | 201647000130 | 7/2016 |
| IN | 26/DEL/2015 | 8/2016 |
| IN | 451/MUM/2015 | 8/2016 |
| IN | 201617018366 | 8/2016 |
| IN | 201647039984 | 12/2016 |
| IN | 201617042238 | 3/2017 |
| IN | 201747022032 | 7/2017 |
| IN | 201717038836 | 12/2017 |
| IN | 201717047079 | 2/2018 |
| IN | 201847003180 | 2/2018 |
| IN | 201847003181 | 2/2018 |
| IN | 201847003227 | 2/2018 |
| JP | 2004-115766 | 4/2004 |
| WO | 2006/076116 | 7/2006 |
| WO | 2019/126327 | 6/2019 |

OTHER PUBLICATIONS

Reply to the Written Opinion dated Jan. 27, 2020 filed in corresponding IA No. PCT/US2019/030534 filed May 3, 2019.
Written Opinion of the International Preliminary Examining Authority dated Mar. 10, 2020 issued in corresponding IA No. PCT/US2019/030534 filed May 3, 2019.
International Preliminary Report on Patentability dated Aug. 7, 2020 issued in corresponding IA No. PCT/US2019/030534 filed May 3, 2019.
Invitation to Pay Additional Fees dated Aug. 14, 2019 issued in corresponding IA No. PCT/US2019/030534 filed May 3, 2019.

\* cited by examiner

ADHESIVE LAMINATES AND METHOD FOR MAKING ADHESIVE LAMINATES

CROSS-REFERENCE TO RELATED APPLICATION

The present application is a 371 of International Application No. PCT/US2019/030534 which was published in English on Nov. 7, 2019, and claims the benefit of U.S. Provisional Patent Application No. 62/666,544 filed May 3, 2018, both of which are incorporated herein by reference in their entireties.

FIELD

Adhesive films and laminates and methods for producing and using the same are described herein.

BACKGROUND

Adhesive laminates are known in the art. Such products are provided in a variety of forms including, for example, tapes, sheets, and labels. Although satisfactory in many respects, a new class of laminates is needed which provide one or more functionalities, and which can be produced in a cost efficient manner.

A variety of techniques are known for applying an adhesive to a face material. Methods are also known in which an adhesive is coated on a secondary material which is then combined with a face material. The adhesive layer can be continuous or discontinuous. Discontinuous adhesive layers typically include regular or uniform patterns or structures. Although such patterning may reduce the amount of adhesive used, the regular or uniform patterns or structures can have limitations, such as ungummed/uncoated edges of the label resulting in poor dispensing, flagging, poor print quality, and/or poor dye cutting. Although satisfactory in many respects, a need remains for additional strategies for depositing adhesive on face materials in which particular properties and/or characteristics of the resulting structure can be maintained or improved.

SUMMARY

Adhesive coated face materials containing a face material defining a first face and an oppositely directed second face are described herein. The term "face material" includes facestock(s), liner(s), and combinations thereof. The terms "facestock" and "liner" may also be used to refer to a specific facestock(s) and/or liner(s). The face material contains adhesive disposed on the first face of the face material. In some embodiments, a critical dimensional ratio of adhesive disposed on the face material is less than about 50, less than about 45, less than about 40, less than about 35, less than about 30, less than about 25 or less than about 20. In some embodiments, the laminate contains a patterned adhesive exhibiting the critical dimensional ratio described above. In some embodiments, the pattern is random. In some embodiments, the adhesive is applied in a random pattern resulting in adhesive fibers on the surface of the face material. Irregular or random patterning of the adhesive can overcome the limitations associated with uniform or regular patterning, such as ungummed edges of the label which can result in poor dispensing, flagging, poor print quality, and/or poor dye cutting Methods for forming an adhesive laminate are also described herein. In some embodiments, the methods include (1) providing a release liner defining a release face and an oppositely directed outer face; (2) applying adhesive to the release face of the release liner to form an adhesive containing release liner; (3) providing a face material defining an inner face and an oppositely directed outer face; and (4) concurrently passing both the adhesive containing release liner and the face material through a nip region defined between rollers of a roller assembly, such that at least a portion of the adhesive is contacted with the inner face of the face material, to form an adhesive laminate. In some embodiments, the method for forming an adhesive laminate is as discussed above, except the adhesive is applied to the inner face of the face material, rather than the release face of the release liner.

Methods for forming an adhesive coated face material are also described herein. In some embodiments, the methods include: (1) providing a release liner defining a release face and an oppositely directed outer face; (2) applying adhesive to the release face of the release liner to form an adhesive containing release liner; (3) providing a face material defining an inner face and an oppositely directed outer face; and (4) concurrently passing both the adhesive containing release liner and the face material through a nip region defined between rollers of a roller assembly, such that at least a portion of the adhesive is contacted with the inner face of the face material. The method may further include separating the release liner from the face material, whereby at least a portion of the adhesive remains with the face material, to form an adhesive coated face material. In some embodiments, the method for forming an adhesive coated face material is as discussed above, except the adhesive is applied to the inner face of the face material, rather than the release face of the release liner.

As will be realized, the subject matter described herein is capable of other and different embodiments and its several details are capable of modifications in various respects, all without departing from the claimed subject matter. Accordingly, the drawings and description are to be regarded as illustrative or exemplary and not restrictive.

DETAILED DESCRIPTION

I. Adhesive Laminates/Adhesive Coated Face Materials

Adhesive region(s) and/or adhesive structures disposed on substrates are described herein. In some embodiments, the adhesive region(s) and/or structures exhibit particular dimensional proportions as described herein. In some embodiments, the adhesive is a pressure sensitive adhesive (PSA). The PSA can be applied using a variety of techniques, such as spraying, onto a face material, e.g., release liner or face stock. Once applied, the PSA may optionally be cured and/or otherwise processed. In some embodiments, the release liner and PSA deposited thereon are then contacted with a face material, such as label stock or a polymeric film, thereby at least partially transferring the PSA to the face material. The release liner may be removed at a later time to expose the PSA face and enable the user to adhere the face material to a substrate of interest. In other embodiments, the face stock (e.g., label stock or a polymeric film) and PSA deposited thereon are then contacted with a release liner. The release liner may be removed at a later time to expose the PSA face and enable the user to adhere the face material to a substrate of interest.

By use of these structures, assemblies, and/or techniques a variety of PSA properties and deposition configurations are now attainable, which were not possible before using conventional methods of depositing PSA onto face materials.

A variety of useful characteristics and beneficial properties of adhesive laminates and adhesive coated face materials are attainable if the adhesive is deposited as described herein and/or transferred to a face material as described herein so that the resulting adhesive regions on the face material exhibit Critical Dimensional Ratios (CDR's) of less than about 50, less than about 45, less than about 40, less than about 35, or less than about 30. Typically, a minimum CDR is about 1. In many embodiments, the adhesive region(s) exhibit a CDR from about 1 to about 10.

Adhesive laminates and/or adhesive coated face materials, particularly those produced using the methods described herein, and more specifically by roll to roll coating of adhesive onto a face layer of the laminate, are also described. Many of these laminates can be configured to provide one or more functions as detailed herein. It will however be understood that the present subject matter includes laminates as described herein, yet which may be produced by techniques other than the unique methods described herein. Thus, the term "coating" as used herein includes an array of deposition and/or material transfer techniques besides transfer coating. For example, the term coating includes direct coating, spraying, brushing, immersing, and other methods. These and other aspects are all described in greater detail herein.

Figure 1:
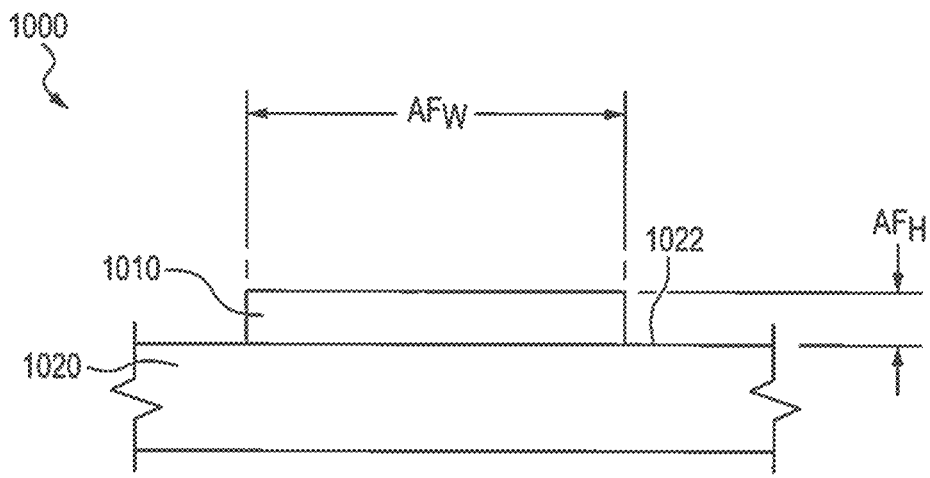
FIG. 1 is a cross sectional schematic illustration of an adhesive region on a substrate in accordance with the present subject matter.

FIG. 1 is a cross sectional schematic illustration of an adhesive region on a substrate as described herein. Specifically, FIG. 1 illustrates an assembly 1000 containing an adhesive region 1010 disposed on a face 1022 of a face material 1020 or other substrate. The adhesion region exhibits an average width distance $AF_W$ and an average thickness or height of $AF_H$. In many embodiments the CDR of adhesive region 1010 is within a range of from 1 to 50.

Figure 2:
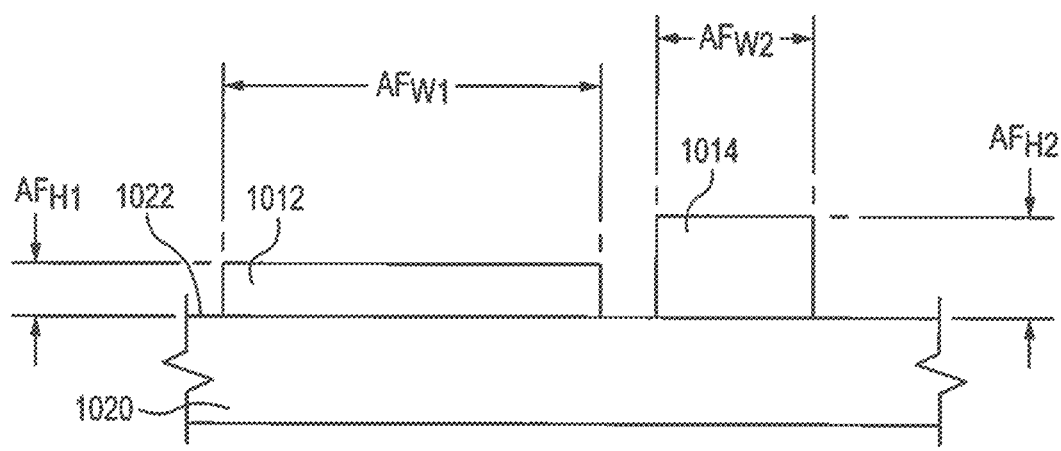
FIG. 2 is a cross sectional schematic illustration of a plurality of adhesive regions on a substrate in accordance with the present subject matter.

The laminates or constructs described herein may have adhesive regions having different dimensions and proportions. For example, FIG. 2 is a cross sectional schematic illustration of a first adhesive region 1012 and a second adhesive region 1014 disposed on a face 1022 of a face material 1020 or other substrate. The first adhesive region 1012 exhibits an average width distance $AF_{W1}$ and an average thickness or height of $AF_{H1}$. The second adhesive region 1014 exhibits an average width distance $AF_{W2}$ and an average thickness or height of $AF_{H2}$. These thicknesses may be different or the same, and these heights may be different or the same. In many embodiments adhesive regions 1012 and/or 1014 exhibit CDRs within a range of from 1 to 50. The CDR of region 1012 may be the same or different than the CDR of region 1014.

A. Adhesives

The laminates/constructs described herein contain one or more adhesives. The adhesive(s) can be a PSA, a non-pressure sensitive adhesive, a hot-melt adhesive, or combinations thereof. In some embodiments, the adhesive is a PSA. The PSA may be any known PSA. In some embodiments, the PSA is a solvent type adhesive, an emulsion type adhesive, or non-emulsion type adhesive. In some embodiments, the PSA is an emulsion adhesive. Hot melt PSAs may also be used. The adhesive may be acrylic or any other useful adhesive which has the hardness and adhesive properties needed for the laminates and/or adhesive coated facestocks. In certain embodiments, the adhesive should have a hardness sufficient to prevent the adhesive squeezing out of the laminate or article during processing.

Exemplary PSAs may be found in (1) Encyclopedia of Polymer Science and Engineering, Vol. 13, Wiley-Interscience Publishers (NewYork, 1988); (2) Polymer Science and Technology, Vol. 1, Interscience Publishers (New York, 1964); (3) those described in U.S. Pat. Nos. 5,164,444; 5,183,459; and 5,264,532, all issued to Bernard, and U.S. Pat. No. 5,385,965, issued to Bernard et al; and (4) combinations thereof. The PSAs may be a solvent based or may be a water based adhesive. Conventional PSAs, including acrylic-based PSAs, rubber-based PSAs and silicone-based PSAs may be used in the laminates/constructs described herein. In one embodiment, the pressure sensitive adhesive contains an acrylic emulsion adhesive.

In some embodiments, the pressure sensitive adhesive is prepared by polymerizing alkyl acrylates, vinyl esters, diesters of dicarboxylic acids and unsaturated acids. The alkyl acrylates typically contain from about 2 to about 12, or from about 4 to about 8 carbon atoms in the alkyl group. Examples of alkyl acrylates include, but are not limited to, ethyl, n-butyl, hexyl, 2-ethylhexyl, and isooctyl acrylates, with 2-ethylhexyl acrylate preferred. In one embodiment, the alkyl acrylates are present in an amount of at least about 35%. In some embodiments, the alkyl acrylates are present in an amount from about 35% to about 60% by weight.

The vinyl esters typically have from about 2 to about 12, or from about 4 to about 8 carbon atoms in the alkyl group. Examples of vinyl esters include, but are not limited to, vinyl acetate, vinyl propionate, vinyl butyrate, vinyl versitate and the like, with vinyl acetate being preferred. In some embodiments, the vinyl esters are present in an amount from about 15% to about 35% or from about 20% to about 25% by weight.

The diesters of the dicarboxylic acids include alkyl esters of unsaturated diacids, such as maleic acid or anhydride and fumaric acids. The alkyl group generally contains from about 2 to about 20, or from about 4 to about 16, or from about 6 to about 12 carbon atoms. Examples of diesters of diacids include, but are not limited to, butyl, octyl fumarate; hexyl, decyl maleate; di-2-ethylhexyl maleate; di-butyl fumarate; and di-2-ethylhexyl fumarate and mixtures thereof. In some embodiments, the diesters of diacids are present in an amount from about 20% to about 35% by weight.

The unsaturated acids generally contain from about 2 to about 12, or from about 2 to about 6 carbon atoms. Examples of the unsaturated acids include, but are not limited to, acrylic acid, methacrylic acid, itaconic acid, and the like. In some embodiments, the unsaturated acids are present in an amount up to 5% or from about 1% to about 3% by weight.

In some embodiments, the resulting thickness(es) of the adhesive region(s) on the face material is within a range of from about 0.1 µm to about 10,000 µm, from about 0.5 µm to about 5,000 µm, from about 1 µm to about 1,000 µm, from about 3 µm to about 500 µm, or from about 5 µm to about 250 µm.

In particular embodiments, the adhesive is deposited on the face material so as to form raised regions or features having particular dimensional proportions. These dimensional proportions can be quantified and are expressed herein as a Critical Dimensional Ratio (CDR) as defined in formula (I):

$$\frac{\text{Adhesive Feature Width}}{\text{Adhesive Feature Height}} \quad (I)$$

"Adhesive Feature Width" as used herein means the average width distance of an adhesive region disposed on a face material and measured in a cross direction relative to the direction of processing of the face material. "Adhesive Feature Height" as used herein means the average thickness of the same adhesive region disposed on a face material and measured in a direction transverse to the plane of the face material.

In some embodiments, the adhesive is deposited or formed in a pattern or non-uniform layer or region. In some embodiments, the adhesive is in the form of a plurality of adhesive regions separated from one another along a face of the face material, facestock, or substrate. When such patterned adhesive layers or regions are incorporated in a laminate as described in greater detail herein, the voids or spaces between adhesive regions are similar in certain aspects to pores or hollow voids. These pores or voids can be utilized in a wide array of functional laminates described in greater detail herein. The terms "patterned" and "discontinuous" are used interchangeably, and both terms are used to mean an adhesive which covers less than 100% of the facestock upon which an adhesive is coated.

In some embodiments, the CDR of the adhesive layer(s) or region(s) is less than about 50, less than about 45, less than about 40, less than about 35, or less than about 30. In some embodiments, the adhesive layer(s) or region(s) has a minimum CDR is about 1. In some embodiments, the adhesive layer(s) or region(s) exhibit a CDR from about 1 to about 10.

B. Release Liners

In some embodiments, the laminates described herein may include one or more release liner(s). The liner may be any useful liner which provides necessary support and release properties. The liner may be made of, or from, a variety of materials including, but not limited to, paper or polymer film liners. In one embodiment, the caliper of the paper is sufficient to die cut the resulting laminate or article. For example, liner calipers can range from about 18 mm to 23 mm for PET liners. In one embodiment, the liner has lay flat properties. In some embodiments, the liner has a machine glaze or finish. In some embodiments, the liner has a silicone hold out layer. The hold out layer provides adhesion between the release coating and the release liner. The silicone holdout layer also prevents the silicone release coating from soaking into the liner.

In some embodiments, the release liner includes a liner having a release coating. The release coating of the release liner provides a releasable bond with the PSA or other adhesive. The release coating may be any composition which provides a desired releasable bond strength.

In one embodiment, the release coating is a silicone release coating. The release coating can be prepared by curing silicone polymers in the presence of a control release agent. In some embodiments, the control release agent is a copolymer of a monofunctional silicone unit of the formula $R_3SiO_{1/2}$ and tetrafunctional silicone units $SiO_{4/2}$ wherein R is an alkyl or alkenyl group. In one embodiment, the alkyl or alkenyl groups contain from about 1 to about 12, or from about 1 to about 6 carbon atoms. Non-limiting examples of alkyl and alkenyl groups include methyl, ethyl, propyl, butyl, hexyl, ethenyl, propenyl, butenyl and hexenyl groups.

The control release agent is typically reacted with a polysiloxane. The polysiloxane may be any polysiloxane which is useful in forming a release coating. Examples of useful polysiloxanes include, but are not limited to, vinyl terminated, hydroxy terminated and epoxy terminated polysiloxanes. In one embodiment, the polysiloxane is a functional polydialkyl siloxane, wherein the alkyl group contains from about 1 to about 6 carbon atoms. The alkyl groups independently include, but are not limited to, methyl, ethyl, propyl, butyl, pentyl, hexyl groups or mixtures thereof. In one embodiment, the alkyl or alkenyl group contains from 1 to about 12, or from 1 to about 6 carbon atoms. The polysiloxane typically has a viscosity average molecular weight of greater than 300,000 centipoise (cps). In another embodiment, the polysiloxane has a viscosity molecular weight from about 300,000 to about 1,000,000 or more. The polysiloxane may be represented by the formula (II):

$$RO((Si(R)_2O)_x)-Si)-R \quad (II)$$

wherein each R is independently as defined above and x is an integer.

In some embodiments, the release coating is prepared with a cross linking agent. In some embodiments, the cross linking agent is a reactive polysiloxane, such as a polydialkyl or polyhydroalkyl siloxane. The alkyl groups are the same as those described above.

The release coating may be applied in a solvent, solventless or emulsion form. The release coating may be cured by any known curing process, e.g. thermal, radiation, etc., to form the release coating. The curing may be catalyzed by silicone soluble complexed compounds of Group VIII transition metals, such as platinum.

Commercially available release agents include, but are not limited to, GE SS-4335, a silicone release agent in unreactive solvent. Commercially available polysiloxanes include, but are not limited to, GE SS-4331, a vinyl terminated polydimethyl siloxane. Commercially available linking agents include, but are not limited to, GE SS-4300C, a polymethyvinyl siloxane. Exemplary catalysts include, but are not limited to, SS-8010 catalyst in toluene. These materials are available commercially from General Electric Company's Silicone Products Division. Similar silicone products are available under the tradename Syl-off from Dow Corning Corporation.

It will be understood that the present subject matter is not limited to any of the noted release coatings or agents, and instead includes nearly any release coating or agent suitable for the intended end use application. Furthermore, although the present subject matter has been described in association with release liners, it will be appreciated that appropriately configured carrier films and other members could be used instead of release liners.

C. Face Material

Suitable face materials include, but are not limited to, synthetic papers such as polyolefin type and polystyrene type; various plastic films or sheets such as polyolefin, polyvinyl chloride, polyethylene terephthalate, polystyrene, polyurethane, polymethacrylate and polycarbonate. Additional examples of suitable face materials include paper and cardboard. The face material may be, or may include, a multilayer polymeric sheet. The multi-layers may be coextruded, or the multi-layers may be laminated together. In one embodiment, the face material includes both co-extruded multi-layers and laminated multi-layers. In addition, a white opaque film may be formed by adding a white pigment to one or more of the aforementioned synthetic resins and used as the face material. In one embodiment, a foamed film is used as the face material. The foamed film may be formed by a conventional foaming operation. In another embodiment, the face material may be a laminated body formed by combining a plurality of single layered sheets composed of the above listed materials. Examples of such a laminated body may include the combination of cellulose fiber paper with synthetic paper, and a laminated body of combined cellulose fiber paper with a plastic film or sheet. In another suitable embodiment, the face material includes coated and uncoated papers, metalized papers, aluminum foil, laminated paper and paper with a polymeric material extruded onto the surface of the paper. In certain versions, the face material can be coated with a liquid absorbent material. The selected face material may be porous or semi-porous. The face material may exhibit certain visibility characteristics such as opaqueness, color, and/or brightness. The face material may include water or other liquid absorbency properties. The face material may be electrically conductive and/or include electrically conductive coatings or regions. A wide array of commercially available face materials can be used such as for example those available under the designation TESLIN.

The thickness of the face material is optionally determined with reference to application specific criteria. Such criteria may include the desired end use. In one embodiment, the sheet thickness is in a range of from about 10 μm to about 300 μm. In another embodiment, the sheet thickness is in a range of from about 20 μm to about 200 μm. In still another embodiment, the sheet thickness is in a range of from about 30 μm to about 150 μm. Optionally, a primer treatment or a corona discharging treatment or a plasma treatment may be used on the face material to increase a bonding strength between the face material and a dried topcoat composition to be formed on a surface of the face material.

In certain embodiments described herein, the face material exhibits one or more functions or functional characteristics. For example, the face material may be selected to enable or promote an indication such as a visual indication of a liquid, outgassing such as directing or allowing flow of air or gas across a thickness of the face material, water or liquid retention within the face material, electrical discharge or conductivity of the face material, chemical delivery across a thickness of the face material, passage of sound across a thickness of the face material, and/or combinations of these functions or characteristics.

D. Optional Layers

The adhesive coated face material and/or laminates described herein can include one or more additional layers or components. Non-limiting examples of such layers include protective layers, tie coat layers, clear layers, color layers, white layers, reflective layers, fluid transfer layers, strength promoting layers, topcoats, print receptive layers, print containing layers, indicia layers, functional layers, and the like.

E. Laminate Properties

The laminates described herein may have specific and useful properties or functionalities. In some embodiments, the techniques described herein enable formation of laminates in which transfer, propagation, and/or migration of liquid, gas, sound waves, electrical current, and/or other agents or elements can occur and is controlled across or through the laminate in a Z-direction. The reference to "Z-direction" as made herein refers to a direction across a thickness dimension of a laminate or portion thereof, and thus references to "X-direction" and/or "Y-direction" refer to directions perpendicular to the Z-direction and correspond to width and length dimensions of the laminate.

Non-limiting representative examples of laminates having certain functionalities which are provided by the present subject matter include liquid indicator laminates, outgassing laminates, water absorbent laminates, sound channeling laminates, electrically conductive laminates, and laminates having combinations of these functionalities and/or laminates having combinations of one or more of these functionalities and additional functionalities.

For example, a liquid indicator laminate can be produced such that the speed of the indicator color change is linked to the facestock selection and porous adhesive properties. A discontinuous structure, such as resulting from pores in the adhesive layer or region(s), can allow, for example, liquid to channel through the discontinuous adhesive from one side of the adhesive to the other side and create a permanent discoloration when a dye or other agent in a functional coating in the laminate is dissolved. Details of this laminate are described in association with FIG. 3.

Figure 3:
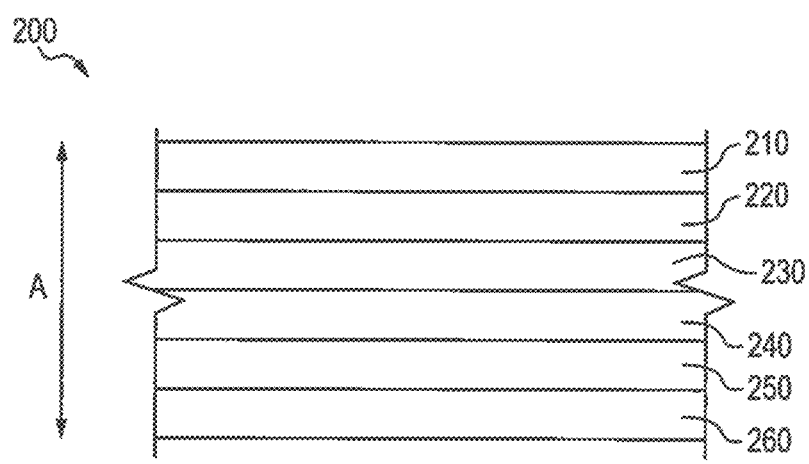
FIG. 3 is a schematic cross sectional view of a liquid indicator laminate in accordance with the present subject matter.

FIG. 3 schematically depicts an embodiment of a liquid indicator laminate 200. The laminate 200 generally comprises a functional facestock or face material 210, a layer or region of patterned adhesive 220, a layer or region of a functional agent 230 that is sensitive to liquid or other medium or component(s) passing through the laminate in the Z-direction, a carrier layer 240 which provides support and stability for the laminate, an optional secondary adhesive layer 250 for bonding or otherwise attaching the laminate to a substrate or surface of interest, and an optional release liner 260. Arrow A in FIG. 3 illustrates the flow of a medium in a Z-direction of the laminate 200.

In one embodiment, a liquid indicator laminate is provided. The speed or rate of the indicator color change is linked to the facestock properties such as for example absorbency of liquid, and porosity of the pattern adhesive in the Z-direction. The indication typically is irreversible and can be measured by color change or by a simple visual comparison.

Typically, the liquid indicator laminate 200 provides visual indication of the presence of a liquid on a surface contacting the patterned adhesive or the underside of the laminate such as an exposed underside of the secondary adhesive layer 250. The layer or region of the functional agent 230 is sensitive to liquid passing through the laminate in that the functional agent may undergo a visibly perceptible change upon exposure to liquid, may be carried or transported with the liquid as the liquid travels in the Z-direction in the laminate, or both of these actions. In certain versions, the layer of functional agent 230 can include one or more dye(s), coloring agent(s), and/or component(s) that migrate or transport through the layer or region of patterned adhesive 220 in the Z-direction to the functional facestock 210. The laminate also includes migration or transfer of dye(s), coloring agent(s), and/or component(s) in an opposite direction for example from the functional facestock 210 to the layer or region of the functional agent 230.

The discoloration of a face or region of the laminate can be measured and quantified by optical change, such as by CIE Lab or by a simple visual comparison. The discoloration can be permanent or nonpermanent. The discoloration can also be temporary and revert to an initial state after passage of a period of time. In some embodiments, the period of time is predetermined.

This phenomenon of transport through discontinuities in an adhesive in the Z-direction can be implemented in other label applications and particularly pressure sensitive adhesive labels, such as for example, labels for outgassing substrates such as by air channeling in the Z-direction, moist substrate labeling such as by liquid channeling in the Z-direction, electrical discharge in the Z-direction, chemical delivery from one layer to another in the Z-direction, and/or sound channeling in the Z-direction. This phenomenon enables passage, transfer, and/or migration of a medium or agent from one side of an adhesive region of a laminate, to another side of the adhesive region. Although medium penetration or transport is noted as being in the Z-direction, it will be understood that the present subject matter is not limited to such and may also include penetration/transport in the X-direction and/or Y-direction.

In some embodiments, the laminates described herein include a layer or region of a secondary adhesive. The secondary adhesive is typically utilized to adhere the laminate to a substrate of interest. The secondary adhesive may contain one or more adhesives which are the same or different than the adhesive of the patterned or porous adhesive. Description of representative examples of secondary adhesives are provided herein. In such an adhesive configuration, the primary adhesive may be coated onto the facestock, the secondary adhesive may be coated onto the release liner, and the coated adhesive and release liner may be laminated together such that the primary and secondary adhesives are in direct contact with each other. Alternatively, or additionally, both the primary and secondary adhesive may be coated on the facestock or the release liner, then laminated together. It is contemplated that the layering of the primary and secondary adhesive relative to the facestock and the release liner may be either facestock, primary adhesive, secondary adhesive, and release liner or facestock, secondary adhesive, primary adhesive, release liner. Regardless of the order of primary and secondary adhesive, it is contemplated that at least one of the primary and secondary adhesive is patterned, taking into consideration that the other adhesive may be continuous.

Figure 4:
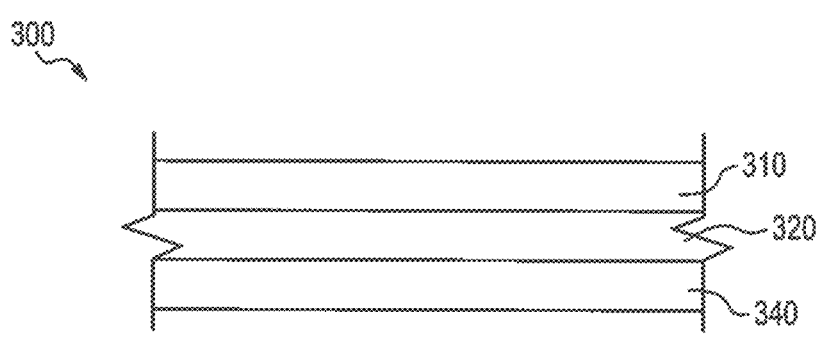
FIG. 4 is a schematic cross sectional view of an outgassing laminate in accordance with the present subject matter.

FIG. 4 schematically depicts an embodiment of an outgassing laminate 300. The outgassing laminate 300 generally contains a functional facestock or face material 310 having a functionality such that air or gas or other media can pass through the facestock 310 in the Z-direction, a layer or region of a patterned adhesive 320 having pores or other voids that are oriented in the Z-direction, and an optional release liner 340.

When laminate 300 is applied as a pressure sensitive adhesive label on a substrate, gas or air can pass from the substrate through the adhesive 320 in the Z-direction to the functional facestock 310. Migration or transport in an opposite direction can also be achieved if the functional facestock allows desired component(s) to pass through the adhesive to the substrate direction. A laminate or label assembly having an outgassing functionality is useful for applications in which issues of substrate outgassing may cause label blistering phenomena. Typical applications include application to in-mold plastic or painted surface(s).

Figure 5:
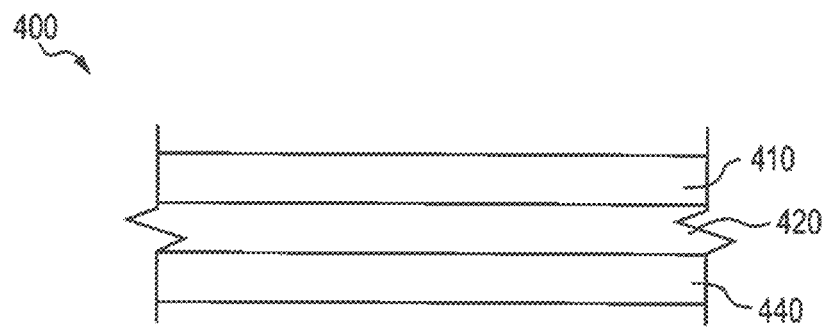
FIG. 5 is a schematic cross sectional view of a water absorbent laminate in accordance with the present subject matter.

FIG. 5 schematically depicts an embodiment of a water absorbent laminate 400. The water absorbent laminate 400 generally contains a functional facestock or face material 410 having a water absorbent property, a layer or region of a patterned adhesive 420 having pores or other voids that are oriented in the Z-direction, and an optional release liner 440.

A laminate such as laminate 400 in which the patterned adhesive is used to channel the liquid from the substrate through the porous adhesive to the functional facestock for water retention can reduce adhesive adhesion issues in moist or sensitive labeling conditions. The liquid absorbency can be measured as a weight build-up in the functional facestock.

When the laminate 400 is applied as a pressure sensitive adhesive label on a moist substrate, the moisture or water will pass from the substrate through the adhesive 420 in the Z-direction to the functional facestock 410. Migration or transport in an opposite direction can also be achieved if the functional facestock allows desired component(s) to pass through the discontinuous adhesive to the substrate direction.

Figure 6:
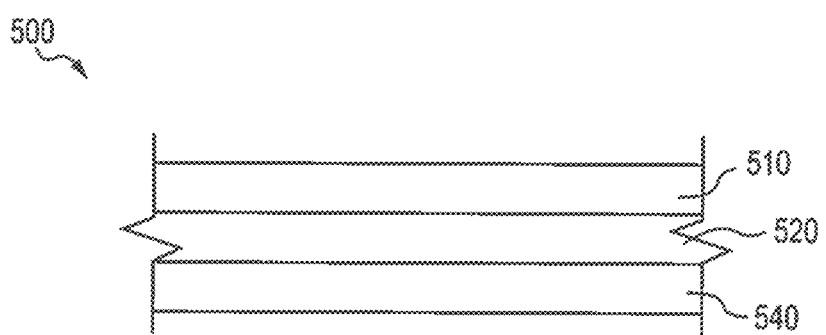
FIG. 6 is a schematic cross sectional view of an electrically conductive laminate in accordance with the present subject matter.

FIG. 6 schematically depicts an embodiment of an electrically conductive laminate 500. The laminate 500 generally contains a functional facestock or face material 510 which is electrically conductive, a layer or region of a patterned adhesive 520 having pores or voids that are oriented in the Z-direction, and an optional release liner 540.

When an electrically conductive facestock is applied as a pressure sensitive adhesive label with a thin patterned adhesive coating on the conductive substrate, the adhesive will allow passage of the electrical current through the adhesive in the Z-direction from the substrate to the functional facestock. Opposite direction electrical flow can be also achieved.

Figure 7:
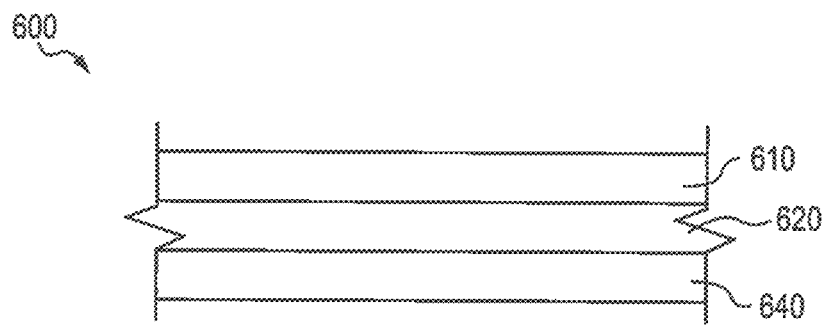
FIG. 7 is a schematic cross sectional view of a sound channeling laminate in accordance with the present subject matter.

FIG. 7 schematically shows an embodiment of a sound channeling laminate 600. The laminate 600 generally contains a functional facestock or face material 610. In many versions, the facestock 610 includes polyurethane. The laminate 600 also contains a layer or region of a patterned adhesive 620 having pores or voids that are oriented in the Z-direction, and an optional release liner 640.

When the laminate 600 is applied as a pressure sensitive adhesive label with a discontinuous adhesive in the Z-direction from the substrate to the functional facestock 610. Opposite direction transmission of sound is also contemplated.

In some embodiments, an array of different arrangements of layers and components may be utilized. In some embodiments using the patterned adhesive, e.g., the layer of discontinuous adhesive, that layer is disposed between a functional facestock and a liner or functional layer. And in the liquid indicator laminates, the patterned adhesive may be disposed between the functional facestock and the layer or region of functional agent that is sensitive to liquid passing through the laminate. And, in the liquid indicator laminates, the layer or region of the functional agent may be disposed between the patterned adhesive and the carrier layer.

Figure 8:
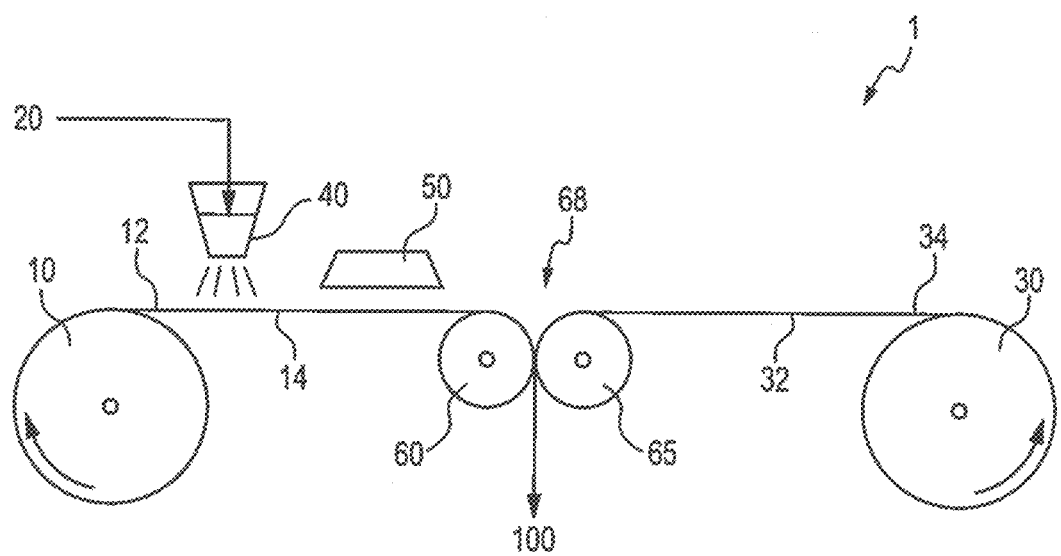
FIG. 8 is a schematic illustration of a system and process in accordance with an embodiment of the present subject matter.

FIG. 8 schematically illustrates a system 1 for forming an adhesive laminate in accordance with an embodiment described herein. It will be understood that the systems and methods described herein may also be used to produce laminates and coated face materials different than the embodiments described herein. The system 1 and related process includes providing a supply of release liner 10 depicted in FIG. 8, for example in roll form. As will be understood, the release liner 10 includes a release face 12 and an oppositely directed outer face 14. The release face 12 includes a release material, release coating, and/or release agent such as described herein. The release liner 10 is directed to a system 40 at which an adhesive composition 20 is applied to the release face 12 of the release liner 10. Typically, in many embodiments the adhesive 20 is applied to the release liner 10 by spraying. However, other or particular spraying application techniques such as, but not limited to, ink jetting, electrospinning, airless spraying, air guided nozzle spraying, and the like, or combinations thereof, may also be used.

After receiving an effective amount of adhesive deposited on the release face 12 of the release liner 10, the adhesive containing release liner is optionally subjected to one or more curing operations depicted in FIG. 8 as curing station 50. The adhesive may be partially or fully cured, cross-linked, or otherwise modified by the optional curing station 50. The curing station 50 may emit heat, radiation, and/or remove solvent(s) from the deposited adhesive. In many instances, the curing results in an increase in viscosity of the adhesive.

The adhesive containing release liner 10 is then directed to a roller assembly that includes a pair of rollers 60, 65 positioned and oriented for contacting and transferring the adhesive. The rollers 60, 65 define a "nip region" 68 between the outer circumferential surfaces of the closely positioned rollers. The nip region is a region extending along a width or span of the rollers and encompasses the interface region between the rollers. FIG. 8 illustrates nip region 68 associated with the rollers 60, 65. The release liner 10 is directed to the first roller 60 and toward the nip region 68.

The system 1 also contains a supply of face material 30 shown in FIG. 8 typically in roll form. The face material 30 includes an inner face 34 and an oppositely directed outer face 32. The face material 30 is directed to the roller assembly and specifically to the second roller 65 and toward the nip region 68.

Both the adhesive containing release liner 10 and the face material 30 are concurrently passed between the rollers 60, 65 and within the nip region 68 such that the adhesive 20 disposed on the release face 12 of the release liner 10 is at least partially contacted with the inner face 34 of the face material 30. The rollers 60, 65 are positioned and oriented relative to each other such that at least a portion of the adhesive 20 is contacted with the inner face 34 of the face material 30. The resulting laminate 100 exiting the rollers 60, 65 is then directed to a collecting station (not shown) which for example winds the laminate in roll form. It is also contemplated that the laminate may be subjected to one or other processing operations such as top coating with one or more protective films, die cutting to shape or form perforations, and/or receiving additional layers or components.

Figure 9:
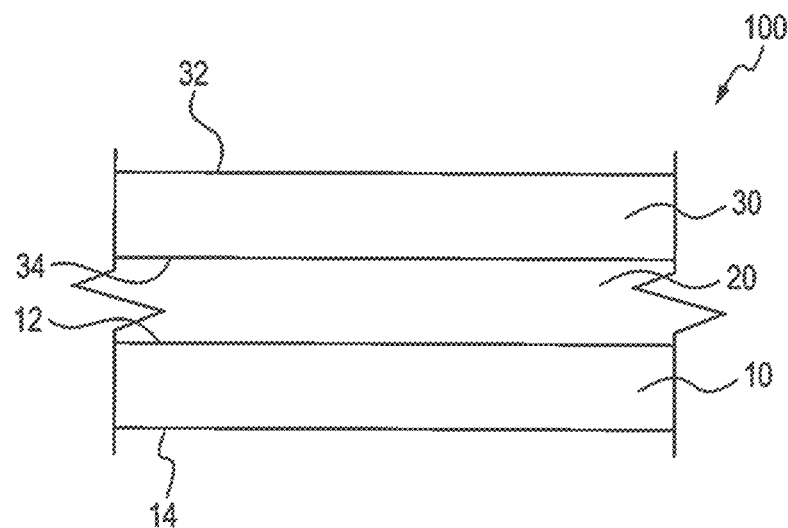
FIG. 9 is a schematic cross sectional view of an adhesive laminate in accordance with the present subject matter.

FIG. 9 schematically illustrates a cross section of a laminate 100 described herein. The laminate 100 contains a face material 30 defining an inner face 34 and an oppositely directed outer face 32. The laminate also contains a release liner 10 defining an inner face 12 and typically includes a release coating, and an oppositely directed outer face 14. The laminate 100 also contains adhesive 20 disposed between the face material 30 and the release liner 10.

Figure 10:
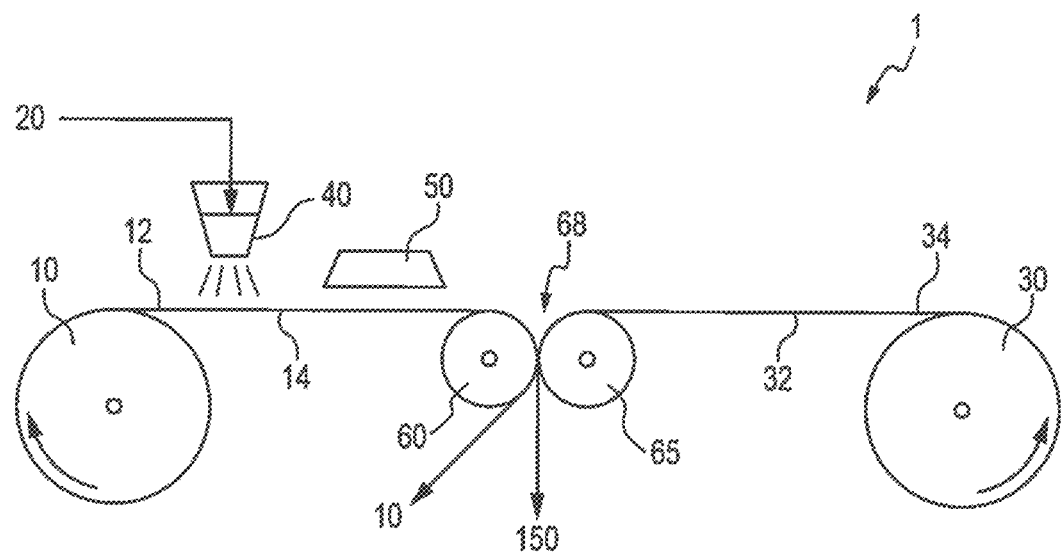
FIG. 10 is a schematic illustration of a system and process in accordance with another embodiment of the present subject matter.

The adhesive coated face materials described can also be formed by a transfer technique. In some embodiments, the release liner initially carrying the adhesive for transfer to the face material is removed or otherwise separated after such transfer. The release liner may be re-used or subsequently rejoined or incorporated with the adhesive coated face material. FIG. 10 schematically illustrates a system and process for producing an adhesive containing face material free of a release liner. The system 1 is the same or similar as the system of FIG. 8, but after passing the liner 10, adhesive 20, and face material 30 through the rollers 60, 65; the release liner 10 is separated from the face material 30 to produce an adhesive containing face material 150. As noted, the liner 10 could be redirected to the source roll 10, redirected for further processing, and/or rejoined with the adhesive containing face material 150.

Figure 11:
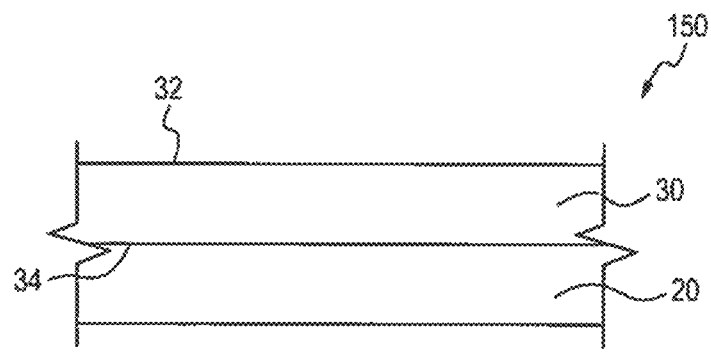
FIG. 11 is a schematic cross sectional view of an adhesive coated face material in accordance with the present subject matter.

FIG. 11 is a schematic cross sectional view of an adhesive containing face material 150. The adhesive containing face material 150 contains a face material 30 as previously described, and a layer or region of adhesive 20 disposed thereon as previously described.

Utilization of the techniques and features described herein enable production of adhesive laminates and/or adhesive coated face materials with fluid/air management characteristics, controlled removability, and/or unique thermal and/or electrical conductivity. In addition, use of these techniques and features enable reductions in materials, e.g., adhesives, and thus enable cost savings. However, it will be understood that the present subject matter includes the adhesive coated face materials and laminates described herein which are formed by other methods than the methods described herein.

The methods of the present subject matter can be performed in a batch, continuous, or semi-continuous fashion. For continuous methods, typical processing speeds range from about 100 m/min to 1,000 m/min. However, it will be understood that the present subject matter is not limited to these speeds and includes processing speeds less than 100 m/min and/or speeds greater than 1,000 m/min.

II. Methods for Making Adhesive Laminates

The adhesive laminates and/or adhesive coated face materials described herein can be prepared or manufactured using techniques for direct coating onto a face material and/or transfer coating of adhesive from a release liner onto a face material. In one embodiment, the methods include depositing an adhesive material onto a release liner, optionally curing or otherwise modifying the deposited adhesive, and then concurrently passing the adhesive coated release liner through rollers with a face material. As the adhesive on the release material is contacted with a face or region of the face material, at least a portion of the adhesive is transferred to the face material. In many embodiments, the resulting laminate of face material, adhesive, and release liner is collected and/or further processed. However, the present subject matter also includes methods in which after passing through the rollers, the release liner is separated and/or removed from the face material. Typically, at least a portion of the adhesive remains with the face material. In other embodiments, the adhesive may be directly coated onto the face material. In still other embodiments, at least a portion of the adhesive may be coated onto an individually cut label or series of labels as an alternative to applying adhesive, either by direct or transfer coating, onto a roll of facestock prior to formation of individual labels.

The methods described herein also includes applying or depositing the adhesive on the release liner or onto the facestock in particular patterns and/or using particular techniques as described herein. In certain embodiments, the adhesive can be applied by spraying in regular or ordered patterns on the release liner. Alternatively, in other embodiments, the adhesive can be applied by spraying in irregular or random patterns. "Irregular" or "random" means not even or balanced in shape or arrangement or pattern orientation variation and heterogeneity that is non-repeating. Irregular or random patterns or patterning can overcome the limitations or problems associated with regular or uniform patterns or patterning including ungummed edges of the label which can result in poor dispensing, flagging, poor print quality, and/or poor dye cutting. Combinations of these techniques can also be used. In certain configurations, multiple adhesives may be deposited simultaneously, sequentially, or in a combination thereof. For example, a first adhesive may be deposited from a first adhesive source and a second, different adhesive may be deposited from a second adhesive source so as to form an intertwined pattern of the two adhesives. Alternatively, or additionally, a first patterned adhesive may be deposited directly onto a substrate followed by a second, distinct adhesive may be deposited on top of the first deposited adhesive. In still other configurations, a first adhesive may be deposited in multiple lanes and a second, distinct adhesive may be deposited in parallel lanes between the lanes of the first adhesive. Of course, other configurations where a first and second adhesive are deposited on different areas of a substrate are also contemplated.

In some embodiments, the adhesive is deposited on the release liner or face material such that one or more regions of the release face of the release liner or face material remain uncovered or exposed. In some embodiments, the coverage of the release face or the face material by the adhesive is less than 100%, less than 95%, less than 90%, less than 85%, less than 80%, less than 75%, less than 70%, less than 60%, less than 50%, less than 40%, and less than 30%. In some embodiments, the adhesive coverage is at least 5%, at least 10%, and in particular embodiments at least 20%. In many embodiments, the coverage of adhesive on the release liner or face material is within a range of from less than about 100% to about 5%, more particularly from about 95% to about 20%, and more particularly from about 60% to about 10%. In other embodiments, the percent coverage is from about 35% to about 70% or from about 40% to about 65%.

In some embodiments, upon directing such adhesive containing release liners to a roller assembly at which the adhesive is contacted with the face material, the extent of coverage of the face material by the adhesive is the same or substantially the same as the coverage of the release face. For example, for an adhesive containing release liner in which the coverage of the release face by adhesive is 70%, after roll to roll transfer to the face material, the coverage of adhesive on the face material is also 70% or approximately 70%. In some embodiments, the coverage of adhesive on a face material is within ±10%, preferably ±5% of the coverage by the adhesive on the release liner. Non-limiting representative examples of coverage of adhesive on a face material include from less than about 100% to about 5%, and typically within a range of from about 95% to about 20%. However, it will be appreciated that the present subject matter includes face materials having specific percentage coverages of about 75%, about 50%, or about 25%.

The present subject matter also includes adhesive laminates and/or adhesive coated face materials that exhibit combinations of these aspects. In some embodiments, the adhesive region(s) exhibit a thickness within a range of from about 20 mm to about 70 mm, a CDR within a range of from about 1 to about 10, and a coverage on a substrate within a range of from about 60% to about 10%.

In other embodiments, adhesives are used which exhibit particular rheological characteristics. In some embodiments, the adhesives exhibit a viscosity within a range of from about 500 cPs to about 100,000 cPs at 150° C. In one embodiment, an adhesive, which when heated to a temperature of 170° C., exhibits a viscosity of less than about 10,000 cPs, and which at ambient temperature will not flow at a pressure of 120 psi, has been found to be capable for forming a patterned adhesive. In some embodiments, if a hot melt adhesive is used, the adhesive exhibits a viscosity within a range of from about 10,000 cPs to about 100,000 cPs at 150° C., preferably from about 30,000 cPs to about 50,000 cPs at 150° C. However, it will be understood that the present subject matter includes other adhesives exhibiting viscosities outside of these ranges.

In some embodiments, the adhesives are free of filler agents. In other embodiments, the adhesives may include filler agents. In some embodiments, fillers are particulate additives which can be added to adhesives to increase the bulk of the adhesive and/or to improve properties. Fillers are commonly used in adhesive formulations to: (1) reduce cost (e.g., addition of calcium carbonate, clay or talc); (2) color the adhesives, for example, by the addition of titanium dioxide, colored toner and security tags; and (3) enhance performance such as by increasing stiffness and tensile strength, reducing cold flow, reducing edge flow, improved cutting, etc. Filler particles may be either inert-non-reinforcing fillers or active-reinforcing fillers. Inert-non-reinforcing fillers or extenders are fillers that do not strongly interact with the adhesive polymer resin. Examples include, but are not limited to, untreated clay, talc, calcium carbonate and titanium dioxide. They are usually included in the adhesive to increase adhesive bulk, reduce the cost, or change the appearance or chemical resistance of the adhesive. Such fillers also improve the handleability of the polymer resin mixture. The active-reinforcing fillers are those which interact with the adhesive polymer resin by promoting, for example, additional cross-linking or filler-polymer interface interaction. Examples of such fillers include, but are not limited to, surface-treated clay, zinc oxide, fine particle size silica and carbon black. The reinforcement is usually defined in terms of an increase in mechanical properties such as tensile strength or modulus, and occasionally, adhesion properties.

EXAMPLES

Example 1. Patterned Hot Melt Adhesives

Figure 12:
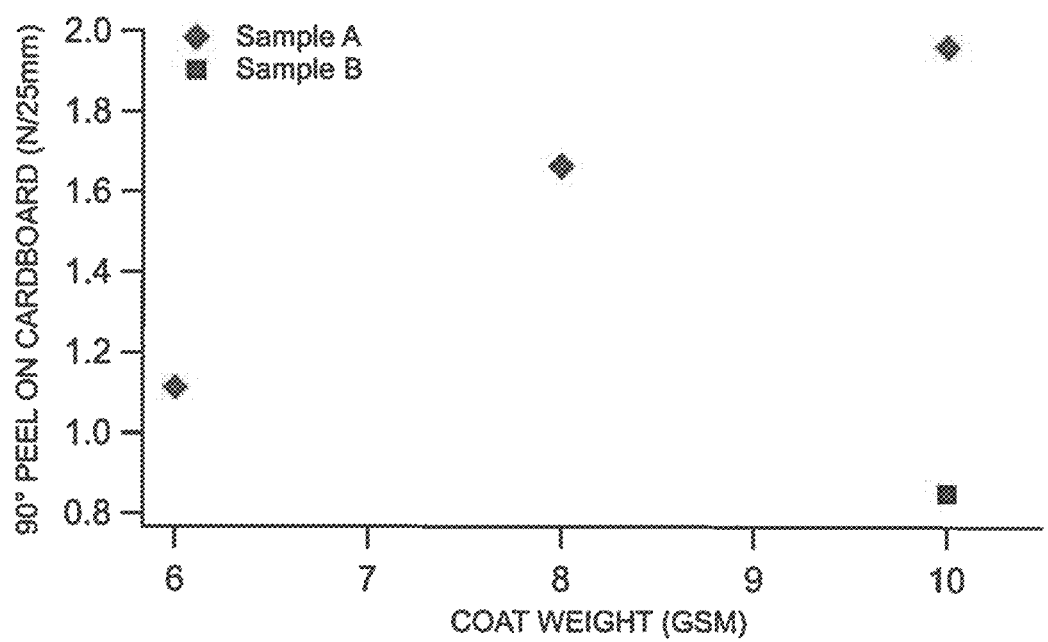
FIG. 12 is a graph comparing peel performance of a patterned adhesive as compared to a uniformly coated adhesive.

A hot melt adhesive was applied to a facestock using two different methods (Samples A and B). Sample A included adhesive applied using a transfer coating spray technique to form a patterned adhesive region on the facestock. Sample B included adhesive applied to the same facestock material using a conventional flood coating method. As shown in FIG. 12, the 90° peel measurements of the samples are plotted as a function of adhesive coat weight. 90° peel measurements were made in accordance with ASTM D6862. The reduced surface area amount or coverage of the adhesive in Sample A resulted in an adhesive having a greater thickness as compared to the adhesive in Sample B. The increased adhesive thickness for Sample A performed well on challenging rough surfaces such as cardboard for example. FIG. 12 shows that peel values for a patterned adhesive applied in accordance with the present subject matter are greater than the peel values for an equivalent amount of adhesive applied using a conventional technique.

A hot melt adhesive having a viscosity of 5030 cPs at 150° C. was applied to a facestock using two different methods (Samples A and B). Sample A included adhesive applied using a transfer coating spray technique to form a patterned adhesive region on the facestock, at a 35%±2% coverage, and a CDR OF 8.9. Sample B included adhesive applied to the same facestock material using a conventional flood coating (100% coverage) method. As shown in FIG. 12, the 90° peel measurements of the samples are plotted as a function of adhesive coat weight. The Sample A required 30% less adhesive to match the peel performance of the uniformly coated sample B.

Figure 13:
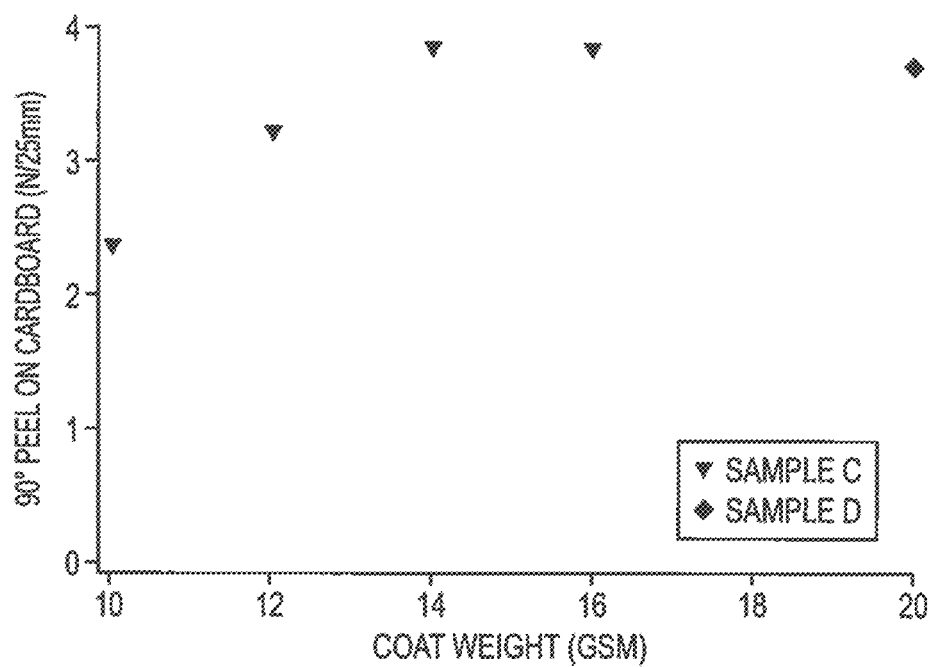
FIG. 13 is a graph comparing peel performance of a patterned adhesive as compared to a uniformly coated adhesive.

A hot melt adhesive having a viscosity of 48,500 cPs at 150° C. was applied to a facestock using two different methods (Samples C and D). Sample C included adhesive applied using a transfer coating spray technique to form a patterned adhesive region at a 62%±3% coverage and a CDR of 2. Sample D included adhesive applied to the same facestock material using a conventional flood coating method known in the art. As shown in FIG. 13, the 90° peel measurements of the samples are plotted as a function of adhesive coat weight. 90° peel measurements were made in accordance with ASTM D6862. The Sample C required 30% less adhesive to match the peel performance of the uniformly coated Sample D.

Figure 14:
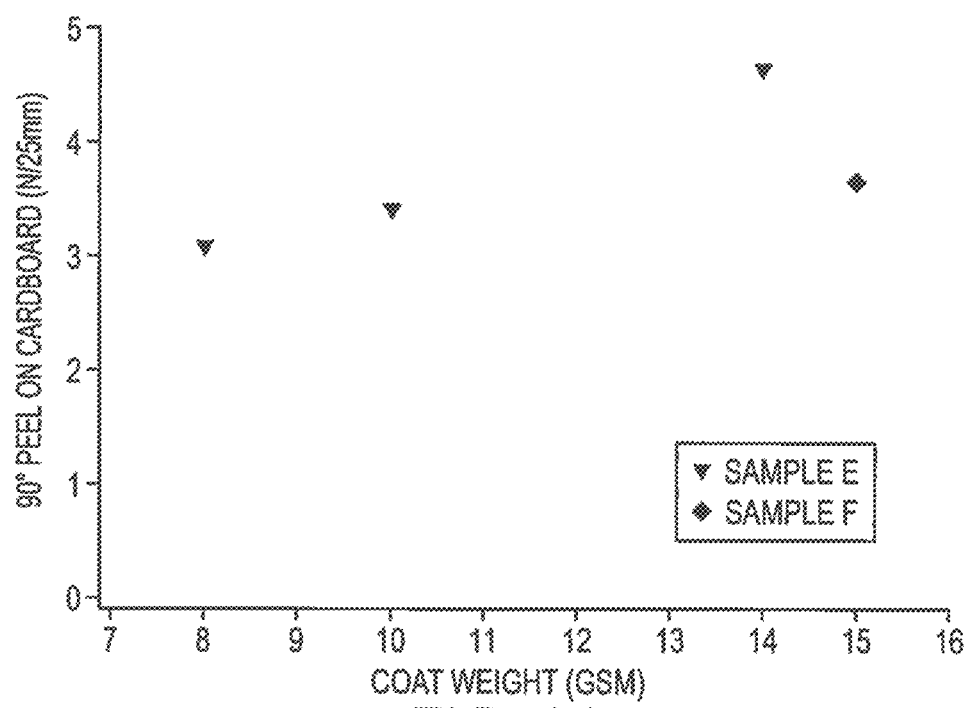
FIG. 14 is a graph comparing peel performance of a patterned adhesive as compared to a uniformly coated adhesive.

A hot melt adhesive having a viscosity of 35,000 cPs at 150° C. was applied to a facestock using two different methods (Samples E and F). Sample E included adhesive applied using a transfer coating spray technique to form a patterned adhesive region on the facestock, at a 57%±4% coverage, and a CDR of 3.5. Sample F included adhesive applied to the same facestock material using a conventional flood coating (100% coverage) method. As shown in FIG. 14, the 90° peel measurements of the samples are plotted as a function of adhesive coat weight. The Sample E required 30% less adhesive to match the peel performance of the uniformly coated Sample F.

Figure 15:
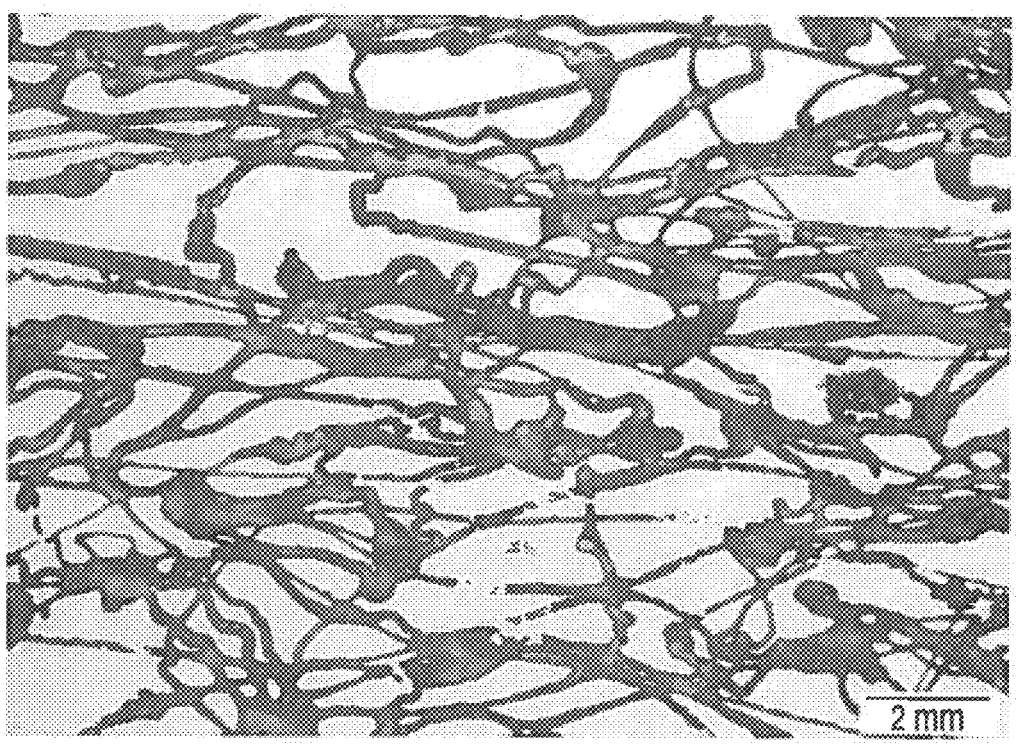
FIG. 15 is a micrograph of a patterned adhesive sample in accordance with an embodiment of the present subject matter.

An adhesive was coated onto facestock material as shown in FIG. 15, which is a micrograph of a patterned adhesive sample in accordance with the present subject matter. FIG. 15 illustrates that the pattern of adhesive regions may be irregular and/or random.

A patterned adhesive layer applied to a rough surface may have an advantage over uniform adhesive coatings when adhered to the same rough surfaces. If two samples have the same volume of adhesive, but one sample has that adhesive applied uniformly, and the other has the adhesive concentrated into a lower percentage area, the second sample has a much higher local thickness in that area (and a correspondingly lower CDR). That high local thickness may allow the sample to adapt to roughness. This may improve the adhesion over that of the uniformly coated sample on the same rough surface. The uniformly coated sample is limited in its conformability and thickness. Should the amplitude of the primary roughness descriptor wave be much larger than the local thickness of the patterned adhesive, this advantage may diminish.

Pattern coverage and thickness may then be tailored for a specific surface roughness. For example, a surface with features 30 microns in height may be challenging for a uniformly coated sample 10 microns thick. The same adhesive, patterned, could have a thickness of 30 microns, matching the feature size of the surface roughness, and improving the adhesion.

All of the adhesive coated face materials, laminates, labels, and other constructions can be provided in various forms. In some embodiments, the forms include a self-wound tape. However, it will be understood that the present subject matter is not limited to wound tapes and includes sheets, in stacked form, folded form, or continuous form.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components and or layers within a laminate for example, which have been herein described and illustrated in order to explain the nature of the present subject matter, may be made by those skilled in the art without departing from the principle and scope of the claimed subject matter, as expressed in the appended claims.

What is claimed is:

1. An adhesive coated face material comprising:
a face material defining a first face and an oppositely directed second face;
a patterned adhesive disposed on the first face of the face material;
wherein a critical dimensional ratio (CDR) of the patterned adhesive disposed on the face material is less than 50,
wherein the CDR is defined in formula (I):

$$\frac{\text{Adhesive Feature Width}}{\text{Adhesive Feature Height}} \quad (I)$$

wherein "Adhesive Feature Width ($AF_W$)" is the average width distance of an adhesive region disposed on a face material and measured in a cross direction relative to the direction of processing of the face material and "Adhesive Feature Height ($AF_H$)" is the average thickness of the same adhesive region disposed on a face material and measured in a direction transverse to the plane of the face material, wherein the adhesive pattern is irregular and/or random, and wherein the adhesive pattern is discontinuous.

2. The adhesive coated face material of claim 1 wherein the critical dimensional ratio is less than 40.

3. The adhesive coated face material of claim 2 wherein the critical dimensional ratio is less than 30.

4. The adhesive coated face material of claim 1 wherein the coverage of adhesive on the face material is less than about 100% to about 5%.

5. The adhesive coated face material of claim 1 wherein the coverage of adhesive on the face material is less than about 75%.

6. The adhesive coated face material of claim 5 wherein the coverage of adhesive on the face material is from about 35% to about 70%.

7. The adhesive coated face material of claim 6 wherein the coverage of adhesive on the face material is from about 40% to about 65%.

8. The adhesive coated face material of claim 1 wherein the thickness of the adhesive on the face material is within a range of from 0.1 µm to 10,000 µm.

9. The adhesive coated face material of claim 8 wherein the adhesive is a pressure sensitive adhesive.

10. The adhesive coated face material of claim 1 further comprising a release liner at least partially contacting the adhesive.

11. The adhesive coated face material of claim 10 wherein the release liner defines a release face and the release liner includes a release agent on the release face.

12. The adhesive of claim 1 wherein the face material visually indicates presence of a liquid contacting the patterned adhesive.

13. The adhesive of claim 1 wherein the face material enables passage of a gas through the patterned adhesive and through the face material.

14. The adhesive of claim 1 wherein the face material absorbs liquid from a surface, through the patterned adhesive.

15. The adhesive of claim 1 wherein the face material conducts electricity through a thickness of the face material.

16. The adhesive of claim 1 wherein the face material conducts sound through a thickness of the face material.

17. The adhesive of claim 1, wherein adhesive is in the form of fibers.

18. The adhesive coated face material of claim 1 wherein the pattern is irregular and random.

19. The adhesive coated face material of claim 1 wherein the pattern is random.

20. The adhesive coated face material of claim 1 wherein the pattern is irregular.

21. The adhesive coated face material of claim 1 wherein the pattern is formable by spraying the adhesive onto the first face of the face material.

22. The adhesive coated face material of claim 21 wherein the spraying is a spraying technique selected from the group consisting of ink jetting, electrospinning, airless spraying, air guided nozzle spraying, and combinations thereof.

23. A laminate comprising:
the adhesive coated face materials of claim 1 and one or more additional films or layers.

24. The laminate of claim 23 wherein the one or more additional layers comprise at least one of a layer or region of a functional agent that is sensitive to liquid passing through the laminate, the patterned adhesive and the at least one layer or region of the functional agent.

25. The laminate of claim 23 wherein the functional agent undergoes a visibly perceptible change upon exposure to liquid.

26. The laminate of claim 23 wherein the functional agent is transported by liquid flowing through the laminate.

27. The laminate of claim 23 wherein the laminate enables passage of a gas through the patterned adhesive and through the functional facestock.

28. The laminate of claim 23 wherein the laminate absorbs liquid from a surface, through the patterned adhesive.

29. The laminate of claim 23 wherein the laminate conducts electricity through a thickness of the laminate.

30. The laminate of claim 23 wherein the laminate conducts sound through a thickness of the laminate.

31. The laminate of claim 23 further comprising a carrier layer, wherein the at least one layer or region of the functional agent is disposed between the patterned adhesive and the carrier layer.

32. A process for forming an adhesive laminate, the process comprising:
providing a release liner defining a release face and an oppositely directed outer face;
applying adhesive in a pattern to the release face of the release liner to form an adhesive containing release liner;
providing a face material defining an inner face and an oppositely directed outer face;
concurrently passing both the adhesive containing release liner and the face material through a nip region defined between rollers of a roller assembly,
such that at least a portion of the adhesive is contacted with the inner face of the face material, to thereby form an adhesive laminate,
wherein a critical dimensional ratio (CDR) of the patterned adhesive disposed on the face material is less than 50,
wherein the CDR is defined in formula (I):

$$\frac{\text{Adhesive Feature Width}}{\text{Adhesive Feature Height}} \quad (I)$$

wherein "Adhesive Feature Width ($AF_W$)" is the average width distance of an adhesive region disposed on a face material and measured in a cross direction relative to the direction of processing of the face material and "Adhesive Feature Height ($AF_H$)" is the average thickness of the same adhesive region disposed on a face material and measured in a direction transverse to the plane of the face material, wherein the adhesive pattern is irregular and/or random, and wherein the adhesive pattern is discontinuous.

33. The process of claim 32 further comprising removing the adhesive laminate from the rollers; and collecting the adhesive laminate in roll form.

34. The process of claim 32 wherein the applying adhesive to the release face of the release liner is performed by spraying the adhesive onto the release face of the release liner.

35. The process of claim 34 wherein the spraying is a spraying technique selected from the group consisting of ink jetting, electrospinning, airless spraying, air guided nozzle spraying, and combinations thereof.

36. The process of claim 32 further comprising after the applying of the adhesive to the release face of the release liner, at least partially curing the adhesive.

37. The process of claim 36 wherein the at least partially curing the adhesive is performed prior to the concurrently passing both the adhesive containing release liner and the face material through the nip region of the roller assembly.

38. The process of claim 32 wherein the adhesive is a pressure sensitive adhesive.

39. The process of claim 32 wherein the release face of the release liner includes a release agent.

40. The process of claim 32 wherein applying adhesive to the release face of the release liner results in a coverage of less than about 100% of adhesive on the release face of the release liner.

41. The process of claim 40 wherein the coverage is less than about 75%.

42. The process of claim 40 wherein the coverage is greater than about 5%.

43. The process of claim 40 wherein the coverage is greater than about 20%.

44. The process of claim 40, wherein the coverage is from about 40% to about 65%.

45. The process of claim 32 wherein the resulting thickness of the adhesive on the face material is within a range of from about 0.1 µm to about 10,000 µm.

46. The process of claim 32 wherein the critical dimensional ratio of adhesive on the face material is less than about 40.

47. The process of claim 46 wherein the critical dimensional ratio of adhesive on the face material is less than about 30.

48. An adhesive laminate formed from the process of claim 32.

49. A process for forming an adhesive laminate, the process comprising:
providing a release liner defining a release face and an oppositely directed outer face;
providing a face material defining an inner face and an oppositely directed outer face;
applying adhesive in a pattern to the inner face of the face material to form an adhesive containing face material;
concurrently passing both the adhesive containing face material and the release liner through a nip region defined between rollers of a roller assembly, such that at least a portion of the adhesive is contacted with the release face of the release liner, to thereby form an adhesive laminate,
wherein a critical dimensional ratio (CDR) of the patterned adhesive disposed on the face material is less than 50,
wherein the CDR is defined in formula (I):

$$\frac{\text{Adhesive Feature Width}}{\text{Adhesive Feature Height}} \quad (I)$$

wherein "Adhesive Feature Width ($AF_W$)" is the average width distance of an adhesive region disposed on a face material and measured in a cross direction relative to the direction of processing of the face material and "Adhesive Feature Height ($AF_H$)" is the average thickness of the same adhesive region disposed on a face material and measured in a direction transverse to the plane of the face material,
wherein the adhesive pattern is irregular and/or random, and
wherein the adhesive pattern is discontinuous.

50. The process of claim 49 further comprising removing the adhesive laminate from the rollers; and collecting the adhesive laminate in roll form.

51. The process of claim 49 wherein the applying adhesive to the inner face of the face material is performed by spraying the adhesive onto the inner face of the face material.

52. The process of claim 51 wherein the spraying is a spraying technique selected from the group consisting of ink jetting, electrospinning, airless spraying, air guided nozzle spraying, and combinations thereof.

53. The process of claim 49 further comprising after the applying of the adhesive to the inner face of the face material, at least partially curing the adhesive.

54. The process of claim 53 wherein the at least partially curing the adhesive is performed prior to the concurrently passing both the adhesive containing face material and the release liner through the nip region of the roller assembly.

55. The process of claim 49 wherein the adhesive is a pressure sensitive adhesive.

56. The process of claim 49 wherein the release face of the release liner includes a release agent.

57. The process of claim 49 wherein applying adhesive to the inner face of the face material results in a coverage of less than about 100% of adhesive on the inner face of the face material.

58. The process of claim 57 wherein the coverage is less than about 75%.

59. The process of claim 57 wherein the coverage is greater than about 5%.

60. The process of claim 57 wherein the coverage is greater than about 20%.

61. The process of claim 57, wherein the coverage is from about 40% to about 65%.

62. The process of claim 49 wherein the resulting thickness of the adhesive on the face material is within a range of from about 0.1 µm to about 10,000 µm.

63. The process of claim 49 wherein the critical dimensional ratio of adhesive on the face material is less than about 40.

64. The process of claim 49 wherein the critical dimensional ratio of adhesive on the face material is less than about 30.

65. An adhesive laminate formed from the process of claim 49.

66. A process for forming an adhesive coated face material, the process comprising:
providing a release liner defining a release face and an oppositely directed outer face;
applying adhesive in a pattern to the release face of the release liner to form an adhesive containing release liner;
providing a face material defining an inner face and an oppositely directed outer face;
concurrently passing both the adhesive containing release liner and the face material through a nip region defined between rollers of a roller assembly, such that at least a portion of the adhesive is contacted with the inner face of the face material;

separating the release liner from the face material, whereby at least a portion of the adhesive remains with the face material, to thereby form an adhesive coated face material, wherein a critical dimensional ratio (CDR) of the patterned adhesive disposed on the face material is less than 50, wherein the CDR is defined in formula (I):

$$\frac{\text{Adhesive Feature Width}}{\text{Adhesive Feature Height}} \quad (I)$$

wherein "Adhesive Feature Width ($AF_W$)" is the average width distance of an adhesive region disposed on a face material and measured in a cross direction relative to the direction of processing of the face material and "Adhesive Feature Height ($AF_H$)" is the average thickness of the same adhesive region disposed on a face material and measured in a direction transverse to the plane of the face material, wherein the adhesive pattern is irregular and/or random, and wherein the adhesive pattern is discontinuous.

67. The process of claim 66 further comprising removing the adhesive coated face material from the rollers; and collecting the adhesive coated face material.

68. The process of claim 66 wherein the applying adhesive to the release face of the release liner is performed by spraying the adhesive onto the release face of the release liner.

69. The process of claim 68 wherein the spraying is a spraying technique selected from the group consisting of ink jetting, electrospinning, airless spraying, air guided nozzle spraying, and combinations thereof.

70. The process of claim 66 further comprising after the applying of the adhesive to the release face of the release liner, at least partially curing the adhesive.

71. The process of claim 70 wherein the at least partially curing the adhesive is performed prior to the concurrently passing both the adhesive containing release liner and the face material through the nip region of the roller assembly.

72. The process of claim 66 wherein the adhesive is a pressure sensitive adhesive.

73. The process of claim 66 wherein the release face of the release liner includes a release agent.

74. The process of claim 66 wherein applying adhesive to the release face of the release liner results in a coverage of less than about 100% of adhesive on the release face of the release liner.

75. The process of claim 74 wherein the coverage is less than about 75%.

76. The process of claim 74 wherein the coverage is greater than about 5%.

77. The process of claim 74 wherein the coverage is greater than about 20%.

78. The process of claim 74, wherein the coverage is from about 40% to about 65%.

79. The process of claim 66 wherein the resulting thickness of the adhesive on the face material is within a range of from about 0.1 µm to about 10,000 µm.

80. The process of claim 66 wherein the critical dimensional ratio of adhesive on the face material is less than about 30.

81. An adhesive coated face material formed from the process of claim 66.

82. A process for forming an adhesive coated face material, the process comprising:

providing a release liner defining a release face and an oppositely directed outer face;

providing a face material defining an inner face and an oppositely directed outer face;

applying adhesive in a pattern to the inner face of the face material to form an adhesive containing face material;

concurrently passing both the adhesive containing face material and the release liner through a nip region defined between rollers of a roller assembly, such that at least a portion of the adhesive is contacted with the release face of the release liner;

separating the release liner from the face material, wherein a critical dimensional ratio (CDR) of the patterned adhesive disposed on the face material is less than 50, wherein the CDR is defined in formula (I):

$$\frac{\text{Adhesive Feature Width}}{\text{Adhesive Feature Height}} \quad (I)$$

wherein "Adhesive Feature Width ($AF_W$)" is the average width distance of an adhesive region disposed on a face material and measured in a cross direction relative to the direction of processing of the face material and "Adhesive Feature Height ($AF_H$)" is the average thickness of the same adhesive region disposed on a face material and measured in a direction transverse to the plane of the face material, wherein the adhesive pattern is irregular and/or random, and wherein the adhesive pattern is discontinuous.

83. The process of claim 82 further comprising removing the adhesive coated face material from the rollers; and collecting the adhesive coated face material.

84. The process of claim 82 wherein the applying adhesive to the inner face of the face material is performed by spraying the adhesive onto the inner face of the face material.

85. The process of claim 84 wherein the spraying is a spraying technique selected from the group consisting of ink jetting, electrospinning, airless spraying, air guided nozzle spraying, and combinations thereof.

86. The process of claim 82 further comprising after the applying of the adhesive to the inner face of the face material, at least partially curing the adhesive.

87. The process of claim 86 wherein the at least partially curing the adhesive is performed prior to the concurrently passing both the adhesive containing face material and the release liner through the nip region of the roller assembly.

88. The process of claim 82 wherein the adhesive is a pressure sensitive adhesive.

89. The process of claim 82 wherein the release face of the release liner includes a release gent.

90. The process of claim 82 wherein applying adhesive to the inner face of the face material results in a coverage of less than about 100% of adhesive on the inner face of the face material.

91. The process of claim 90 wherein the coverage is less than about 75%.

92. The process of claim 90 wherein the coverage is greater than about 5%.

93. The process of claim 90 wherein the coverage is greater than about 20%.

94. The process of claim 90 wherein the coverage is from about 40% to about 65%.

95. The process of claim 82 wherein the resulting thickness of the adhesive on the face material is within a range of from about 0.1 μm to about 10,000 μm.

96. The process of claim 82 wherein the critical dimensional ratio of adhesive on the face material is less than about 40.

97. The process of claim 96 wherein the critical dimensional ratio of adhesive on the face material is less than about 30.

98. An adhesive coated face material formed from the process of claim 82.

* * * * *